UNITED STATES PATENT OFFICE.

JULIUS HOERLIN, OF UERDINGEN-ON-THE-RHINE, GERMANY, ASSIGNOR TO CHEMISCHE FABRIKEN VORMALS WEILER-TER-MEER, OF UERDINGEN-ON-THE-RHINE, GERMANY.

PROCESS OF MAKING A YELLOW SULFUR DYE.

No. 796,514.　　　Specification of Letters Patent.　　　Patented Aug. 8, 1905.

Application filed March 25, 1905. Serial No. 252,087.

*To all whom it may concern:*

Be it known that I, JULIUS HOERLIN, a subject of the King of Würtemberg, residing at Uerdingen-on-the-Rhine, Germany, have invented a certain new and useful Improvement in Yellow Sulfur Dyes, of which the following is a specification.

This invention relates to a process for the manufacure of a yellow sulfur dye.

I have found that by heating sulfur to a high temperature with a mixture of benzidin and nitroethenyle-o-phenylendiamin (nitro-a-methylebenzimidazole) or the amido compound a sulfur dye is obtained which imparts to cotton a pure greenish-yellow color of great durability and strength, the tint being somewhat more green than that obtained by means of dye produced from sulfur and the amido compound alone. As compared with the latter dye the dye produced according to my process has the advantage that in its manufacture at least one-half of the expensive benzimidazole can be replaced by benzidin. Moreover, the nitrobenzimidazole, which can be used in place of the amidobenzimidazole, is more easy to manipulate in a solid state.

I will now state an example of the manner in which my process can be carried out, but desire it to be known that the proportions of sulfur and benzidin can be modified within certain limits without substantially interfering with the reaction.

One part of nitroethenyle-o-phenylendiamin, one part of benzidin, and four parts of sulfur are heated for several hours to a temperature of from 200° to 240° centigrade until the separation of sulfureted hydrogen has almost ceased.

The product can be directly used for dyeing; but it is preferably first dissolved in sodium sulfid, then filtered, and finally separated by means of dilute acid or the like. The dye is in the form of a yellow powder, insoluble in alcohol and soda, but fairly soluble in soda-lye and sodium sulfid in the presence of heat. The sulfurous alkaline solution of the dye imparts to cotton a very strong and pure greenish-yellow color.

I am aware that a dye has been obtained by melting sulfur with the nitroethenyle-o-phenylendiamin, (nitro-a-methylbenzimidazole,) which has been produced by Heim by heating p-nitro-o-phenylenediamin with acetic anhydrid to a temperature of 190° and of which an almost quantitive yield can be obtained by boiling for several hours nitro-o-phenylendiamin with glacial acetic acid and that a yellow sulfur dye can easily be obtained by heating sulfur with p-amido-a-methylbenzimidazole. The dye which has been produced by melting sulfur with nitro-diacetyl-o-phenylendiamin and benzidin is for the most part insoluble and its strength is considerably less than that of the dye made by my process.

What I claim as my invention, and desire to secure by Letters Patent, is—

The process for the manufacture of yellow sulfur dye consisting in mixing nitro-ethenyl-o-phenylendiamin (nitro-a-methylbenzimidazole) with benzidin and sulfur and heating the mixture to a high temperature.

In witness whereof I have signed this specification in the presence of two witnesses.

JULIUS HOERLIN.

Witnesses:
　W. BRUCE WALLACE,
　H. MÜLLER.